United States Patent
Tanaka et al.

(10) Patent No.: US 8,480,462 B2
(45) Date of Patent: Jul. 9, 2013

(54) BLOWING-MODE DOOR FOR VEHICLE AIR-CONDITIONING APPARATUS AND VEHICLE AIR-CONDITIONING APPARATUS USING THE SAME

(75) Inventors: Yasunari Tanaka, Aichi (JP); Tomohiko Sibata, Aichi (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 952 days.

(21) Appl. No.: 12/593,344

(22) PCT Filed: Apr. 18, 2008

(86) PCT No.: PCT/JP2008/057633
§ 371 (c)(1),
(2), (4) Date: Sep. 28, 2009

(87) PCT Pub. No.: WO2008/130038
PCT Pub. Date: Oct. 30, 2008

(65) Prior Publication Data
US 2010/0120348 A1 May 13, 2010

(30) Foreign Application Priority Data
Apr. 18, 2007 (JP) .................. 2007-108934

(51) Int. Cl.
*B60H 1/00* (2006.01)
(52) U.S. Cl.
USPC ............ 454/159; 454/155; 454/156; 454/143
(58) Field of Classification Search
USPC .................. 454/159, 155, 156, 143
See application file for complete search history.

(56) References Cited

U.S. PATENT DOCUMENTS 5,000,612 A * 3/1991 Swars .................. 403/282
5,775,407 A * 7/1998 Inoue .................. 165/42
(Continued)

FOREIGN PATENT DOCUMENTS
DE 10127347 A1 12/2002
FR 2897926 A1 8/2007
(Continued)

OTHER PUBLICATIONS

Official Communication of Intention to Grant a Patent dated Jul. 2, 2012, issued in corresponding European Patent Application No. 08740679.9.
(Continued)

*Primary Examiner* — Steven B McAllister
*Assistant Examiner* — Nathaniel Herzfeld
(74) *Attorney, Agent, or Firm* — Westerman, Hattori, Daniels & Adrian, LLP

(57) ABSTRACT

There are provided a blowing-mode door for a vehicle air-conditioning apparatus in which leakage of temperature-adjusted air can be prevented to improve independent temperature-adjusting performance by minimizing the gap between the mode door and a partition plate and increasing the rigidity of the mode door, as well as a vehicle air-conditioning apparatus using the same. A blowing-mode door applied to a vehicle air-conditioning apparatus with an independent temperature-adjusting system is provided in which the blowing-mode door includes a rotating shaft having a predetermined length and a pair of left and right plate-like doors that are molded integrally with the rotating shaft, with a gap for preventing interference with a partition plate therebetween.

9 Claims, 6 Drawing Sheets

U.S. PATENT DOCUMENTS

| | | | |
|---|---|---|---|
| 6,019,163 A * | 2/2000 | Saida et al. | 165/42 |
| 6,536,474 B2 * | 3/2003 | Akahane | 137/625.44 |
| 6,799,432 B2 * | 10/2004 | Nagaya et al. | 62/244 |
| 7,726,391 B2 * | 6/2010 | Seo et al. | 165/202 |
| 2001/0021635 A1 | 9/2001 | Akahane | |
| 2007/0293135 A1 * | 12/2007 | Hori et al. | 454/121 |
| 2008/0108293 A1 * | 5/2008 | Haupt et al. | 454/156 |
| 2010/0263828 A1 * | 10/2010 | Chikagawa et al. | 165/59 |
| 2011/0284183 A1 * | 11/2011 | Yamashita et al. | 165/63 |

FOREIGN PATENT DOCUMENTS

| | | |
|---|---|---|
| JP | 11048746 A * | 2/1999 |
| JP | 2001-253223 A | 9/2001 |
| JP | 2004-066919 A | 3/2004 |
| JP | 2004-210034 A | 7/2004 |
| JP | 2005-001411 A | 1/2005 |
| JP | 3713780 B2 | 11/2005 |

OTHER PUBLICATIONS

Supplementary European Search Report dated Sep. 21, 2011, issued in corresponding European Patent Application No. 08740679.9.

International Search Report for PCT/2005/057633, mailing date of May 20, 2008.

* cited by examiner

BLOWING-MODE DOOR FOR VEHICLE AIR-CONDITIONING APPARATUS AND VEHICLE AIR-CONDITIONING APPARATUS USING THE SAME

TECHNICAL FIELD

The present invention relates to a blowing-mode door applied to a vehicle air-conditioning apparatus in which an air channel formed in a case is partitioned into a plurality of channels by a partition plate so that the temperature of the air channels can be adjusted independently, as well as to an independent-temperature-adjusting vehicle air-conditioning apparatus using the same.

BACKGROUND ART

A known vehicle air-conditioning apparatus is provided with a partition plate in an air-conditioner case to partition the air channel into a plurality of channels so that the temperature of the air channels can be adjusted independently. This vehicle air-conditioning apparatus is configured to blow temperature-adjusted air independently, for example, to the driver seat and the passenger seat of the vehicle. This is generally configured such that an air channel downstream of an evaporator disposed in the air-conditioner case is partitioned into two left and right channels by a partition plate, and each of the air channels accommodates a heater core that heats the air, a bypass channel that bypasses the heater core, and an air-mixing damper that adjusts the ratio between the amount of air that circulates through the heater core and the amount of air that circulates through the bypass channel, wherein the degrees of the openings of the air-mixing dampers are independently adjusted so that the temperatures of air to be blown to the driver seat and the passenger seat can be independently adjusted.

In such a so-called left-and-right-independent-temperature-adjusting vehicle air-conditioning apparatus, air outlets, such as a face air outlet, a foot air outlet, and a defrosting air outlet, through which temperature-adjusted air is blown into the vehicle cabin are provided for each of the driver seat and the passenger seat. These air outlets are provided with blowing-mode doors, such as a face door, a foot door, and a defrosting door, that open or close the air outlets. The blowing-mode doors are each generally provided with one rotating shaft and a pair of left and right plate-like doors at the left and right thereof, with a specified gap therebetween to prevent interference with the partition plate, and are integrally formed of a resin material.

Various inventions have been made to install the above-configured blowing-mode doors into the two air channels in the air-conditioner case partitioned by the partition plate in such a manner as to straddle the partition plate. Patent Document 1 discloses one in which the partition plate is mounted in one of the air-conditioner cases separated into the left and right, and the blowing-mode doors are inserted through communication holes formed between the partition plate and the air-conditioner case so that the blowing-mode doors are installed.

Patent Document 2 proposes a structure in which substantially C-shaped bearings are provided at the periphery of the partition plate, the blowing-mode doors are each mounted to the partition plate in advance by fitting a shaft between the pair of left and right plate-like doors of the mode doors into the bearings, with the partition plate put between by the pair of left and right plate-like doors, and this is installed in the separated-structure air-conditioner case. Furthermore, Patent Document 3 proposes a structure in which a peripheral portion corresponding to the plate doors, which extends into the gap between the plate-like doors, is formed along the periphery of the partition plate, and one end of the rotating shaft of the mode door is inserted into a bearing of one of the separate air-conditioner cases, and thereafter, the peripheral portion corresponding to the plate doors is inserted into the gap in the mode door by moving the plate surface of the partition plate parallel to the partition surface of the case to thereby install it into the air-conditioner case.

Patent Document 1: the Publication of Japanese Patent No. 3713780
Patent Document 2: Japanese Unexamined Patent Application, Publication No. 2001-253223
Patent Document 3: Japanese Unexamined Patent Application, Publication No. 2005-1411

DISCLOSURE OF INVENTION

To ensure the independent temperature-adjusting performance in the vehicle air-conditioning apparatus of the system involving adjusting the temperatures of the individual air channels, it is important to reduce leakage (circulation) of temperature-adjusted air between the plurality of air channels as much as possible. If a large amount of temperature-adjusted air leaks, when the temperature in one air channel is adjusted, the temperature in the other air channel is changed along therewith, so that the independent temperature-adjusting performance is impaired. With the structure in which a large communication hole for inserting the mode door is provided between the partition plate and the air-conditioner case, as in the above-described Patent Document 1, leakage of temperature-adjusted air through the communication hole cannot be prevented, posing the problem of degrading the independent temperature-adjusting performance. The structures shown in Patent Documents 2 and 3 improve the independent temperature-adjusting performance by eliminating such a communication hole.

Meanwhile, for the blowing-mode doors, a resin door in which the rotating shaft and the pair of left and right plate-like doors are molded in one piece is used. These mode doors are generally manufactured by injection molding. However, if there is an extreme difference in the wall thickness of the molded portion, deformation due to shrinkage tends to occur, causing a gap when the air outlets are opened and closed. Therefore, it is difficult to increase the thickness of only the rotating shaft to thereby improve the rigidity of the doors because of molding restrictions. The mode doors are provided with elastic sealing members, and when the air outlets are opened and closed, a rotational torque is applied to one end of the rotating shaft(s) by an actuator to press the elastic sealing members against the case and sealing surfaces of the partition plate. Therefore, if the rigidity of the rotating shaft is low, the rotating shaft is twisted due to the reaction force of the elastic sealing member, generating gaps at the sealing portions. In particular, the above-described mode doors tend to decrease in torsional rigidity at the center of the rotating shafts because a gap is formed between the left and right plate-like doors, so that the sealing performance at the plate-like door provided at the other end of the rotating shaft tends to be decreased. These gaps also cause leakage of temperature-adjusted air, reducing the independent temperature-adjusting performance.

One shown in Patent Document 2 is such that the partition plate is provided with the C-shaped bearing, into which the rotating shaft of the mode door is fitted and is passed through the partition plate. Therefore, there is little leakage of temperature-adjusted air through the rotating-shaft through-portion. However, this structure cannot ensure sufficient torsional strength because the thickness of the rotating shaft cannot be increased, so that there is the possibility that the rotating shaft is twisted due to the reaction force of the elastic sealing member because of the insufficient rigidity of the rotating shaft, thus generating gaps on the sealing surfaces. Accordingly, there still remains a problem in bypassing temperature-adjusted air due to the insufficient strength of the mode doors.

To cope with the above-described insufficient strength of the doors, Patent Document 3 shows one in which a thick reinforcing member that is thicker than the left and right plate-like doors is integrally formed in the inner part of the gap, that is, at a portion next to the rotating shaft, and the bases of the left and right plate-like doors are integrally connected to each other with the reinforcing member to thereby increase the strength of the doors. However, with such a structure, an arc-shaped notch that is sufficiently larger than the arc-shaped notch in which the rotating shaft rotates must be provided in the partition plate so that the reinforcing member can rotate together therewith. Therefore, this arc-shaped notch serves as a leakage gap for the temperature-adjusted air, which inevitably degrades the independent temperature-adjusting performance.

The present invention is made in consideration of the above-described circumstances, and it is an object thereof to provide a blowing-mode door for a vehicle air-conditioning apparatus in which leakage of temperature-adjusted air can be prevented to improve the independent temperature-adjusting performance by minimizing the gap between the blowing-mode door and the partition plate at a portion where the mode door straddles the partition plate and by increasing the rigidity of the mode door, as well as a vehicle air-conditioning apparatus using the same.

To solve the above problems, a blowing-mode door for a vehicle air-conditioning apparatus and a vehicle air-conditioning apparatus using the same of the present invention adopt the following solutions.

A blowing-mode door for a vehicle air-conditioning apparatus according to a first aspect of the present invention is a blowing-mode door applied to a vehicle air-conditioning apparatus in which an air channel is partitioned into a plurality of channels by a partition plate and temperature adjustment can be performed independently for each of the air channels. The blowing-mode door includes a rotating shaft having a predetermined length; and a pair of left and right plate-like doors that are molded integrally with the rotating shaft, with a gap for preventing interference with the partition plate therebetween, wherein the rotating shaft is formed in a cross sectional form having ribs around the shaft, the ribs extending in the direction parallel to or perpendicular to the plate surfaces of the plate-like doors or in both directions; and circular ribs that connect the ribs together are provided between the pair of left and right plate-like doors of the rotating shaft having the cross sectional form, at a plurality of locations with a predetermined pitch.

For the vehicle air-conditioning apparatus capable of independent temperature adjustment for each of a plurality of air channels, such as a right-and-left independent-temperature-adjusting system, to maintain independent temperature-adjusting performance, it is important to prevent leakage of temperature-adjusted air between the air channels. That is, if temperature-adjusted air leaks between the air channels, when the temperature in one air channel is adjusted, the temperature in the other air channel is changed along therewith, resulting in a loss of independent temperature-adjusting performance. The cause of the leakage of the temperature-adjusted air can be leakage of the temperature-adjusted air through the gap between the partition plate and the blowing-mode door disposed astride it or leakage of the temperature-adjusted air through a gap caused when the strength of the door is decreased due to a gap formed between the pair of left and right plate-like doors, causing the mode door to twist due to the reaction force of an air-blocking elastic sealing member provided on the mode door.

According to the first aspect of the present invention, the ribs are provided around the rotating shaft of the mode door to thereby increase the strength of the rotating shaft, and the circular ribs that connect the ribs together are provided with a predetermined pitch at a plurality of locations of the rotating shaft corresponding to the gap between the pair of left and right plate-like doors. This can improve the torsional rigidity of the portion of the rotating shaft corresponding to the gap at which the strength of the door is decreased. This can prevent leakage of the temperature-adjusted air caused by twisting of the mode door due to the reaction force of the elastic sealing member, thereby improving the independent temperature-adjusting performance. In addition, the circular ribs that join the ribs around the rotating shaft function as air-blocking ribs against the leakage of the temperature-adjusted air from between the ribs. This can prevent leakage of the temperature-adjusted air through the gap between the mode door and the partition plate, thereby improving the independent temperature-adjusting performance.

In the blowing-mode door for the vehicle air-conditioning apparatus of the first aspect, the rotating shaft, the pair of left and right plate-like doors, and the circular ribs may be integrally molded of a resin material.

For the integrally molded resin door, it is necessary to make the wall thickness as uniform as possible to prevent deformation due to shrinkage during molding.

With the above configuration, the ribs are provided around the rotating shaft, and the circular ribs are provided at a plurality of locations with a predetermined pitch. Therefore, a difference in wall thickness of the entire door, including the thickness of the plate-like door, can fall within a fixed range. This can therefore improve the moldability of the mode door to allow manufacture of a high-precision blowing-mode door that is not deformed and can prevent leakage of the temperature-adjusted air, etc. arising from deformation during molding. Since the ribs around the rotating shaft extend in the direction parallel to or perpendicular to the plate surfaces of the plate-like doors or in both the directions, die cutting during integral molding can be simplified.

In one of the blowing-mode doors for the vehicle air-conditioning apparatus according to the first aspect, at least one of the circular ribs may be provided at a position facing an end face of the partition plate to serve also as an air-blocking rib.

With this configuration, one circular rib is provided at a position facing an end face of the partition plate to serve also as an air-blocking rib. Therefore, it is possible to reduce the gap between the partition plate and the blowing-mode door disposed astride it as much as possible. This can reliably reduce the amount of leakage of the temperature-adjusted air through the gap between the partition plate and the blowing mode door, thereby improving the independent temperature-adjusting performance.

In one of the blowing-mode doors for the vehicle air-conditioning apparatus according to the first aspect, at least two of the circular ribs may be respectively integrally joined with the pair of left and right plate-like doors.

With this configuration, the two circular ribs are respectively integrally connected to the pair of left and right plate-like doors. Therefore, it is possible to further improve the torsional rigidity of the portion of the rotating shaft corresponding to the gap at which the strength of the door is decreased. Accordingly, it is possible to reliably reduce the amount of leakage of the temperature-adjusted air caused by twisting of the mode door due to the reaction force of the air-blocking elastic sealing member, thereby improving the independent temperature-adjusting performance.

In one of the blowing-mode doors for the vehicle air-conditioning apparatus according to the first aspect, the circular ribs may be provided at least three locations, wherein the circular rib at the center may be provided at a position facing an end face of the partition plate to serve also as an air-blocking rib, and the other ribs at two locations may be respectively integrally joined with the pair of left and right plate-like doors.

With this configuration, the circular ribs are provided at least three locations, wherein the circular rib at the center is provided at a position facing an end face of the partition plate to serve also as an air-blocking rib, and the ribs at the two other locations are respectively integrally joined with the pair of left and right plate-like doors. The gap between the partition plate and the blowing-mode door can be decreased as much as possible using the air-blocking rib, and the torsional rigidity of the portion of the rotating shaft corresponding to the gap at which the strength of the door is decreased can be improved using the other two circular ribs. Thus, this can prevent both leakage of the temperature-adjusted air through the gap between the partition plate and the blowing-mode door and leakage of the temperature-adjusted air caused by twisting of the mode door due to the reaction force of the elastic sealing member, thereby improving the independent temperature-adjusting performance owing to the combined effect thereof.

In one of the blowing-mode doors for the vehicle air-conditioning apparatus according to the first aspect, the axial thicknesses of the circular ribs may be larger than the thickness of the partition plate.

With this configuration, the axial thicknesses of the circular ribs are set larger than the thickness of the partition plate. Therefore, even if the installation position of the blowing-mode door or the installation position of the partition plate is slightly displaced, the opposing relationship between the circular ribs and the partition plate can be maintained provided that it falls within the axial thicknesses of the circular ribs, and thus the gap between the partition plate and the blowing-mode door can be blocked. This can assuredly prevent leakage of the temperature-adjusted air through the gap between the partition plate and the blowing-mode door even if some assembly errors occur.

A vehicle air-conditioning apparatus according to a second aspect of the present invention is a vehicle air-conditioning apparatus equipped with a partition plate that partitions an air channel formed in an air-conditioner case into a first channel and a second channel, first temperature-adjusting means and second temperature-adjusting means provided in the first channel and the second channel, respectively, and capable of independently adjusting the temperatures of air blown into a vehicle cabin through the individual channels, a plurality of air outlets through which the temperature-adjusted air adjusted by the first temperature-adjusting means and the second temperature-adjusting means is individually blown into the vehicle cabin, and a plurality of blowing-mode doors provided at the plurality of air outlets and selectively opening and closing the air outlets, wherein the blowing-mode doors are the blowing-mode door according to one of the above.

According to the second aspect of the present invention, the plurality of blowing-mode doors that are provided at the plurality of air outlets and selectively open and close the air outlets are the blowing-mode door according to one of the first aspect. This can improve the torsional rigidity of the portion of the rotating shaft corresponding to the gap at which the strength of the blowing-mode door is decreased to thereby prevent leakage of the temperature-adjusted air caused by twisting of the mode door due to the reaction force of the elastic sealing member and can minimize the gap between the partition plate and the blowing-mode door astride it, thereby preventing leakage of the temperature-adjusted air through the gap. This can improve the temperature-adjusting performance of the vehicle air-conditioning apparatus capable of independent temperature adjustment for each of the plurality of air channels.

In the vehicle air-conditioning apparatus according to the second aspect, the partition plate may have semicircular notches at the periphery thereof, part of the notches being open to the exterior in correspondence with the installation positions of the blowing-mode doors; and the blowing-mode doors may be installed such that the circular ribs of the rotating shaft are fitted in the notches.

With this configuration, the partition plate has the semicircular notches at the periphery thereof, part of the notches being open to the exterior in correspondence with the installation positions of the blowing-mode doors; and the blowing-mode doors are installed such that the circular ribs provided around the rotating shaft of the blowing-mode doors are fitted in the notches. The fitting of the semicircular notches and the circular ribs can reduce the gaps between the partition plate and the blowing-mode doors astride it as much as possible, thereby reducing the amount of leakage of the temperature-adjusted air through the gaps. This can improve the temperature-adjusting performance of the vehicle air-conditioning apparatus capable of independent temperature adjustment for each of the plurality of air channels.

In the vehicle air-conditioning apparatus according to the second aspect, the notches may have a T-shaped cross-sectional rib along the peripheries thereof.

With this configuration, the notches have the T-shaped cross-sectional rib along the peripheries thereof. Therefore, even if the installation positions of the blowing-mode doors or the installation position of the partition plate are displaced, the fitting relationship between the circular ribs and the notches can be maintained, so that the gaps between the partition plate and the blowing-mode-doors can be blocked with the circular ribs provided that they fall within the axial thickness of the T-shaped rib. This can assuredly prevent leakage of the temperature-adjusted air through the gaps between the partition plate and the blowing-mode doors even if some assembly errors occur.

In the vehicle air-conditioning apparatus according to the second aspect, the blowing-mode doors may be mounted in the notches of the partition plate, with the periphery of the partition plate being inserted into the gaps, and may be installed in the air-conditioner case together with the partition plate.

With this configuration, the blowing-mode doors are mounted in the notches of the partition plate, with the periphery of the partition plate being inserted into the gaps, and is installed in the air-conditioner case together with the partition plate. This eliminates the need for providing the partition plate with another notch etc. other than the notches for combining the blowing-mode doors. Thus, this can reliably reduce leakage of the temperature-adjusted air through the gaps between the partition plate and the blowing-mode doors astride it. Moreover, since the blowing-mode doors can be mounted to the partition plate and can be installed in the air-conditioner case together with the partition plate, the mode doors can easily be installed in the air-conditioner case partitioned by the partition plate.

With the blowing mode door for the vehicle air-conditioning apparatus of the present invention, the ribs are provided around the rotating shaft of each mode door, and the circular ribs that connect the ribs together are provided with a predetermined pitch at a plurality of locations of the rotating shaft corresponding to the gap between the pair of left and right plate-like doors to thereby improve the torsional rigidity of the portion of the rotating shaft corresponding to the gap at which the strength of the door is decreased. This can prevent leakage of the temperature-adjusted air caused by twisting of the mode door due to the reaction force of the elastic sealing member, thereby improving the independent temperature-adjusting performance. In addition, the circular ribs that join the ribs around the rotating shaft function as air-blocking ribs against the leakage of the temperature-adjusted air from between the ribs. This can prevent leakage of the temperature-adjusted air through the gap between the mode door and the partition plate, thereby improving the independent temperature-adjusting performance.

Additionally, with the vehicle air-conditioning apparatus of the present invention, the torsional rigidity of the portion of the rotating shaft corresponding to the gap at which the strength of the blowing mode door is decreased is improved, so that leakage of the temperature-adjusted air caused by twisting of the mode door due to the reaction force of the air-blocking elastic sealing member can be prevented, and the gap between the partition plate and the blowing-mode door astride it is minimized, so that leakage of the temperature-adjusted air can be prevented. Therefore, it is possible to improve the temperature-adjusting performance of the vehicle air-conditioning apparatus capable of independent temperature adjustment for each of the plurality of air channels.

EXPLANATION OF REFERENCE SIGNS

Figure 1:
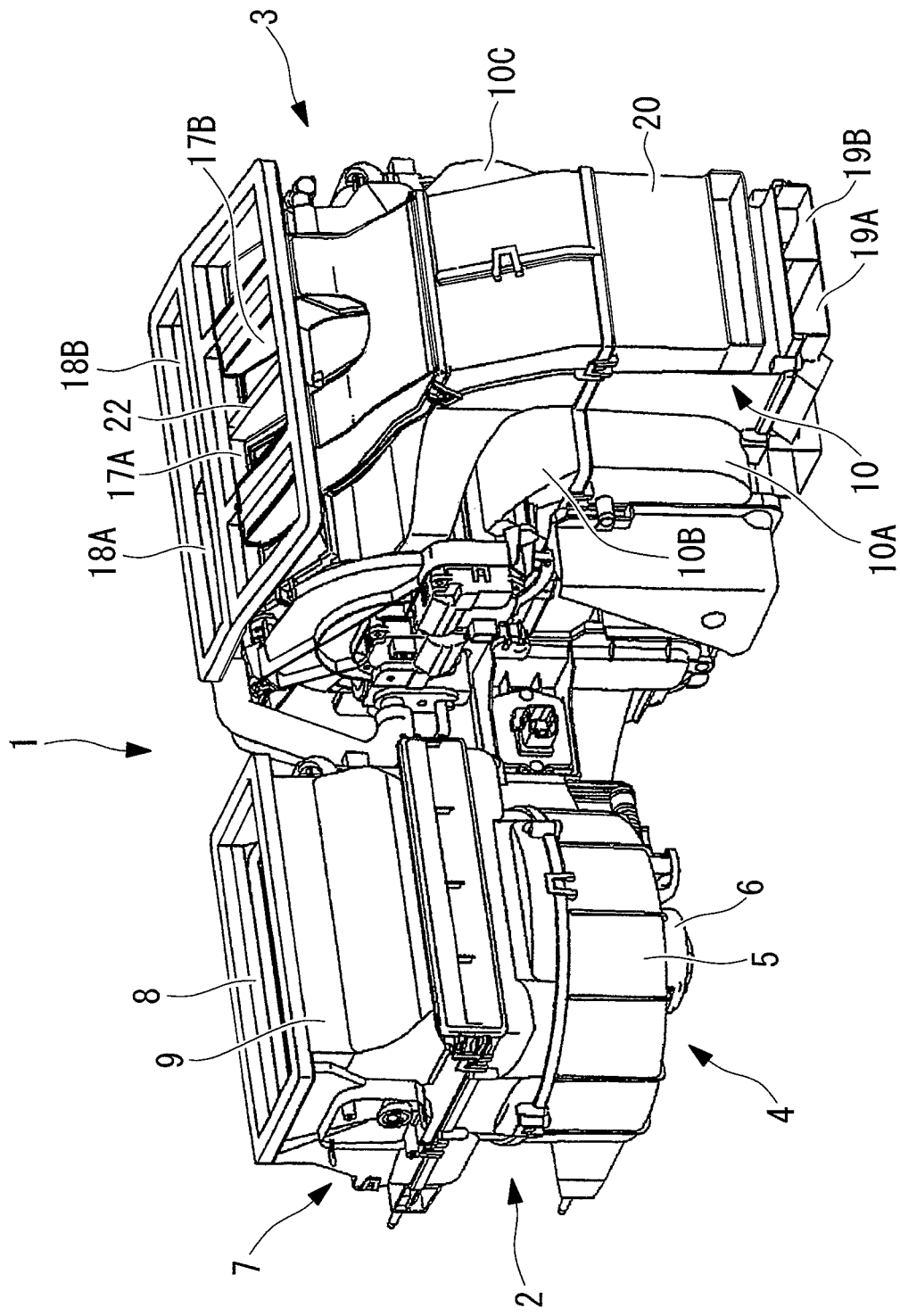
FIG. 1 is an external perspective view of a vehicle air-conditioning apparatus according to a first embodiment of the present invention.

1: vehicle air-conditioning apparatus
3: air-conditioning unit
10: air-conditioner case
13A, 13B: air-mixing damper (temperature adjusting means)
14: face door (blowing-mode door)
15: defrosting door (blowing-mode door)
16: foot door (blowing-mode door)
17A, 17B: face air outlet
18A, 18B: defrosting air outlet
19A, 19B: foot air outlet
21, 21A, 21B: air channel
22: partition plate
22B: T-shaped rib
36A, 36B, 36C: semicircular notch
40, 50: rotating shaft
41: gap
42A, 42B: plate-like door
43, 53: rib
44, 54: circular rib

BEST MODE FOR CARRYING OUT THE INVENTION

Embodiments according to the present invention will be described with reference to the drawings.

First Embodiment

A first embodiment of the present invention will be described hereinbelow with reference to FIGS. 1 to 7D.

FIG. 1 shows an external perspective view of a vehicle air-conditioning apparatus 1 according to the first embodiment of the present invention. The vehicle air-conditioning apparatus 1 is constituted of an air-blowing unit 2 that intakes external air from the exterior of the vehicle or internal air from the interior of the vehicle cabin and sends the air to the downstream side and an air-conditioning unit (HVAC unit) 3 connected to the downstream side of the air-blowing unit 2 and adjusts the temperature of the air sent from the air-blowing unit 2 to a set temperature and blows it into the vehicle cabin.

The air-blowing unit 2 is constituted of a centrifugal air blower 4 provided with an impeller (not shown) driven by a motor 6 in a casing 5 and an internal/external-air switching unit 7 connected to an air inlet of the casing 5. The internal/external-air switching unit 7 is constituted of an internal/external-air switching case 9 having a top-open external-air inlet 8 and a side-open internal-air inlet (not shown) adjacent thereto and an internal/external-air switching damper (not shown) provided in the internal/external-air switching case 9, into which either the external air from the exterior of the vehicle or the internal air from the interior of the vehicle cabin can be selectively introduced.

Figure 2:
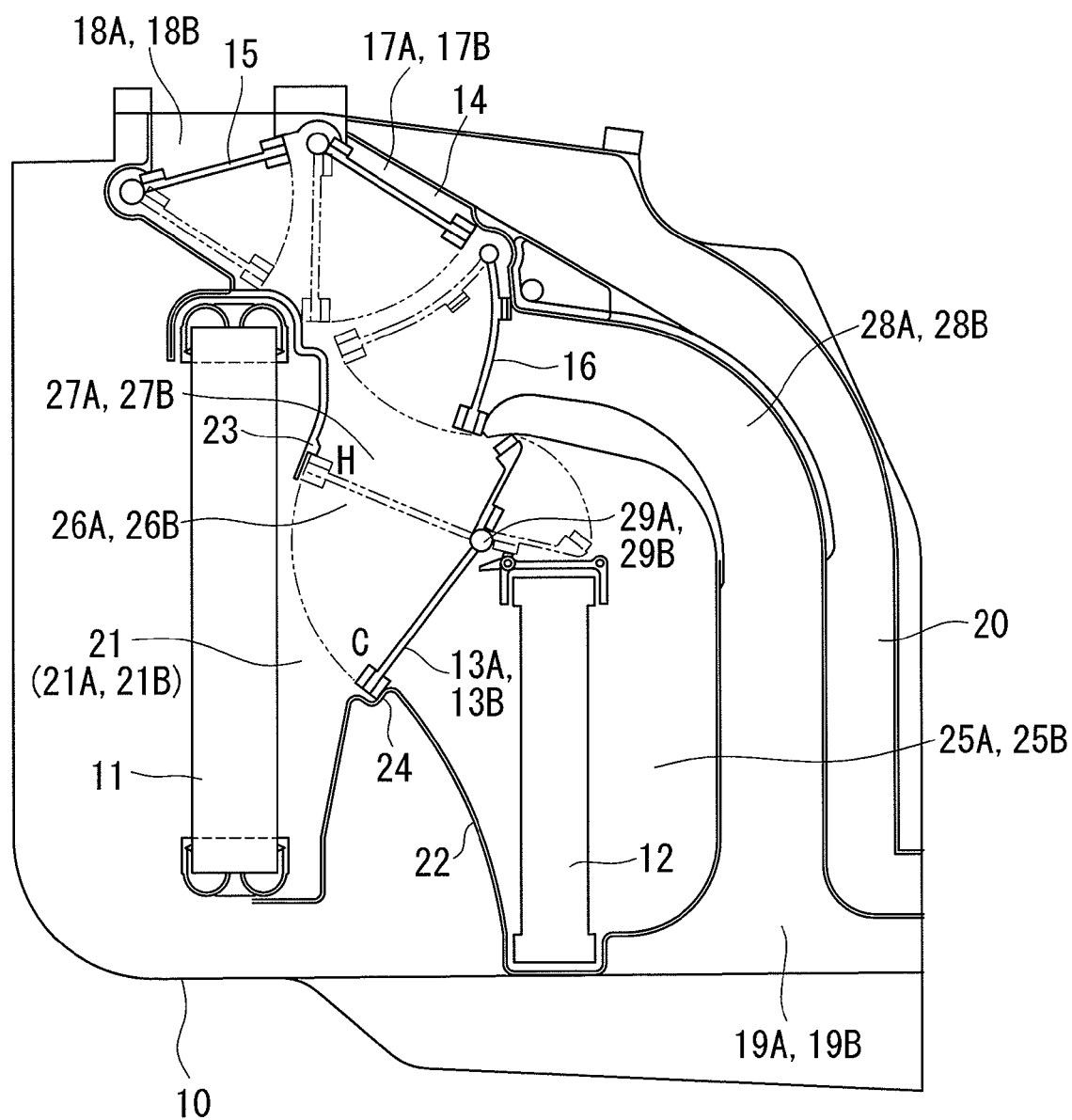
FIG. 2 is a vertical sectional view of an air-conditioning unit of the vehicle air-conditioning apparatus shown in FIG. 1.

The air-conditioning unit 3 has an air-conditioner case 10 that is separated into a plurality of pieces, and, as shown in FIG. 2, is configured such that devices, such as an evaporator 11, a heater core 12, air-mixing dampers 13A and 13B, and a plurality of blowing-mode doors, including a face door 14, a defrosting door 15, and a foot door 16 are accommodated inside this air-conditioner case 10. The air-conditioning unit 3 is provided with face air outlets 17A and 17B, defrosting air outlets 18A and 18B, foot air outlets 19A and 19B, and a rear-seat duct 20 and is configured such that these air outlets 17A, 17B, 18A, 18B, 19A, and 19B and the rear-seat duct 20 are selectively opened and closed by the face door 14, the defrosting door 15, and the foot door 16 which are operatively connected together so that temperature-adjusted air is blown into the vehicle cabin through a selected air outlet.

Figure 3:
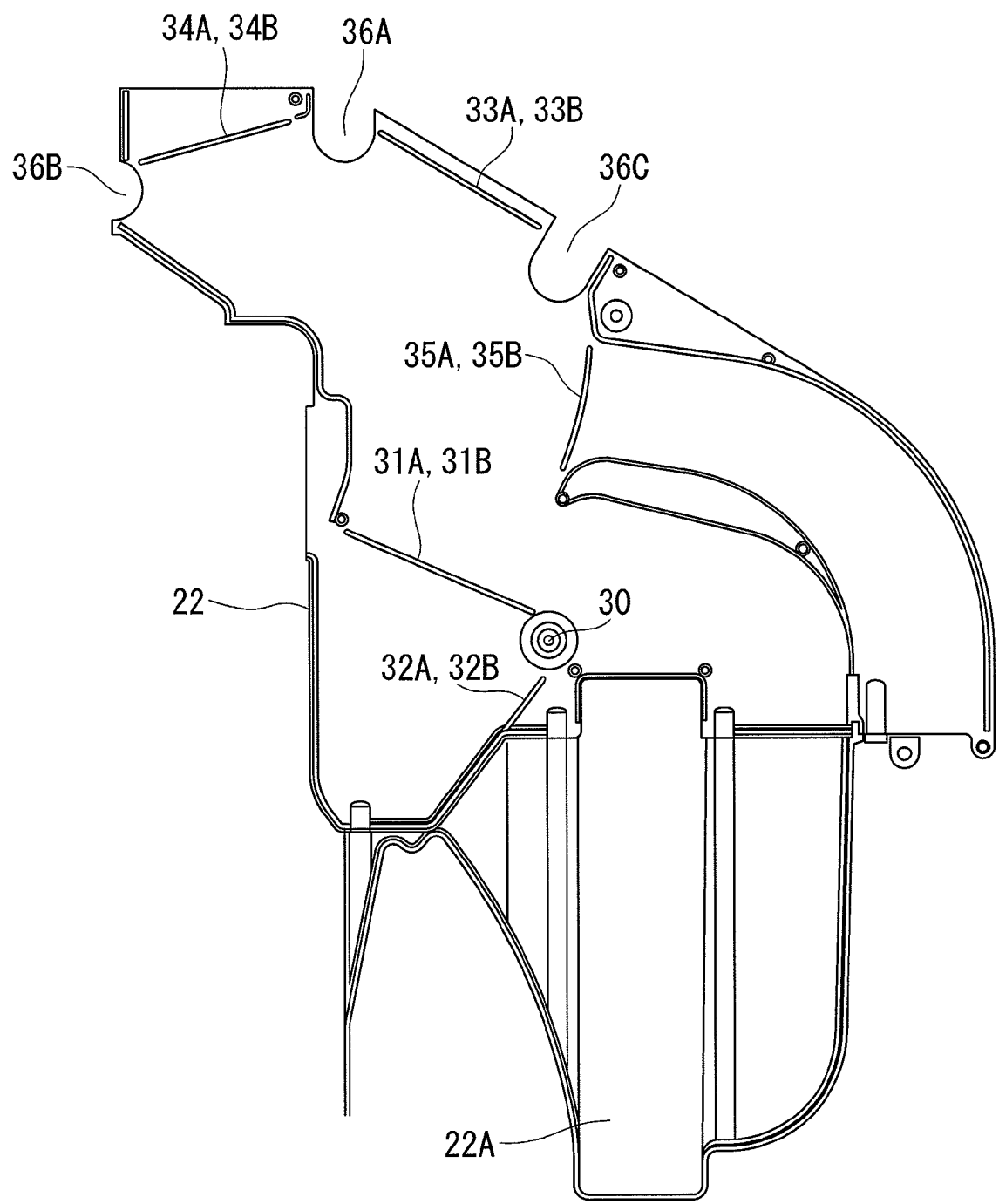
FIG. 3 is a side view of a partition plate of the air-conditioning unit of the vehicle air-conditioning apparatus shown in FIG. 1.

The air-conditioner case 10 is formed of, for example, a resin case that is separated into a lower case 10A and left and right upper cases 10B and 10C, in which an air channel 21 that circulates an airflow sent from the air-blowing unit 2 is formed. A partition plate 22, as shown in FIG. 3, is inserted in the air channel 21 to partition the air channel 21 into two left and right air channels 21A and 21B at the downstream side of the evaporator 11. The air channels 21A and 21B are formed at the front and back of the partition plate 22, respectively, in the direction perpendicular to the plane of FIG. 2.

The air channels 21A and 21B are temporarily narrowed by two upper and lower sealing portions 23 and 24 with which the air-mixing dampers 13A and 13B are brought into contact, respectively, at the downstream side of the evaporator 11 and are thereafter temporarily branched to two channels, that is, warm-air channels 25A and 25B in which a heater core 12 is disposed and bypass channels 26A and 26B that bypass the heater core 12. The warm-air channels 25A and 25B are oriented upward at the downstream side of the heater core 12 and are joined again with the bypass channels 26A and 26B in air-mixing regions 27A and 27B above the heater core 12. The air channels 21A and 21B continue to the face air outlets 17A and 17B and the defrosting air outlets 18A and 18B at the downstream side of the air-mixing regions 27A and 27B and also respectively continue to the foot air outlets 19A and 19B through foot channels 28A and 28B and to a rear air outlet (not shown) through the rear-seat duct 20.

The evaporator 11 constitutes a known refrigerating cycle together with a compressor, a condenser, an expansion valve, etc. (not shown) to exchange heat between refrigerant circulated in the refrigerating cycle and air sent from the air-blowing unit 2 and evaporate the refrigerant to cool the air. The evaporator 11 is formed of a tube-fin type stacked heat exchanger with a rectangular outer shape having a predetermined thickness and is disposed vertically at the extreme upstream position of the air channel 21 in the air-conditioning unit 3 so as to cross the air channel 21.

The heater core 12, through which warm water circulates from a vehicle engine (not shown) through a cooling water circuit, passes through a through-hole 22A of the partition plate 22 and is disposed across the two warm-air channels 25A and 25B to exchange heat between the warm water and the air cooled by the evaporator 11, thereby heating the air. The heater core 12 is formed of a tube-fin type stacked heat exchanger with a rectangular outer shape having a predetermined thickness and is disposed vertically so as to cross the warm-air channels 25A and 25B substantially parallel to the evaporator 11.

The air-mixing dampers 13A and 13B are located between the evaporator 11 and the heater core 12, and rotating shafts 29A and 29B thereof are disposed in the vicinity of the upper end of the heater core 12 so that they can rotate relative to the air-conditioner case 10 and the partition plate 22. The end portions of the air-mixing dampers 13A and 13B are movably adjusted to any position between the maximum cooling position (max cool position) C at which the end portions are in contact with the sealing portion 24 to fully close the inlets of the warm-air channels 25A and 25B and the maximum heating position (max hot position) H at which the end portions are in contact with the sealing portion 23 to fully close the inlets of the bypass channels 26A and 26B. The two left and right air-mixing dampers 13A and 13B are independently operated to allow the temperatures of air circulated through the two air channels 21A and 21B to be independently adjusted.

Of the plurality of blowing-mode doors, the face door 14 is disposed across the partition plate 22 so as to be rotatable at the face air outlets 17A and 17B; the defrosting door 15 is disposed across the partition plate 22 so as to be rotatable at the defrosting air outlets 18A and 18B; and the foot door 16 is rotatably disposed at the inlets of the foot channels 28A and 28B astride the partition plate 22. The face door 14, the defrosting door 15, and the foot door 16 are operated so as to open and close the individual outlets in cooperation with one another. That is, they can be switched among a face mode in which the face door 14 is open, a defrosting mode in which the defrosting door 15 is open, a foot mode in which the foot door 16 is open, a bilevel mode in which both the face door 14 and the foot door 16 are open, a defrosting foot mode in which both the defrosting door 15 and the foot door 16 are open, etc. The inlet of the rear-seat duct 20 is connected next to the face air outlets 17A and 17B in the longitudinal direction (in the front-to-back direction of the vehicle) so that cool air or warm air that is adjusted in temperature can be introduced to the rear seat side.

The partition plate 22 partitions the warm-air channels 25A and 25B and the bypass channels 26A and 26B of the air channel 21, at the downstream side of the evaporator 11, through the air-mixing regions 27A and 27B to the face air outlets 17A and 17B, the defrosting air outlets 18A and 18B, and the foot channels 28A and 28B, then into the two air channels 21A and 21B, and is configured to introduce temperature-adjusted air that has passed through one air channel to the driver seat side and temperature-adjusted air that has passed through the other air channel to the passenger seat side, so that the temperature-adjusted air is blown out through the respective air outlets provided in correspondence with the driver seat and the passenger seat.

The partition plate 22 is provided with, in addition to the through-hole 22A in which the heater core 12 is disposed, a bearing 30 that supports the rotating shafts 29A and 29B of the air-mixing dampers 13A and 13B, and sealing surfaces 31A, 31B, 32A, and 32B for the air-mixing dampers 13A and 13B, sealing surfaces 33A and 33B for the face door 14, sealing surfaces 34A and 34B for the defrosting door 15, and sealing surfaces 35A and 35B for the foot door 16, which protrude to the left and right. Semicircular notches 36A, 36B, and 36C are provided at three locations of the periphery of the partition plate 22, corresponding to the positions at which the blowing-mode doors are disposed, so that the face door 14, the defrosting door 15, and the foot door 16 are disposed astride the partition plate 22. The semicircular notches 36A, 36B, and 36C are open to the exterior so that the face door 14, the defrosting door 15, and the foot door 16 can be assembled thereon from the exterior of the periphery.

For the face door 14, the defrosting door 15, and the foot door 16 that constitute the plurality of blowing-mode doors, doors with substantially the same structure are used, although with slight differences in size and shape. The structure thereof will be described hereinbelow using the face door 14 as a typical example.

Figure 4:
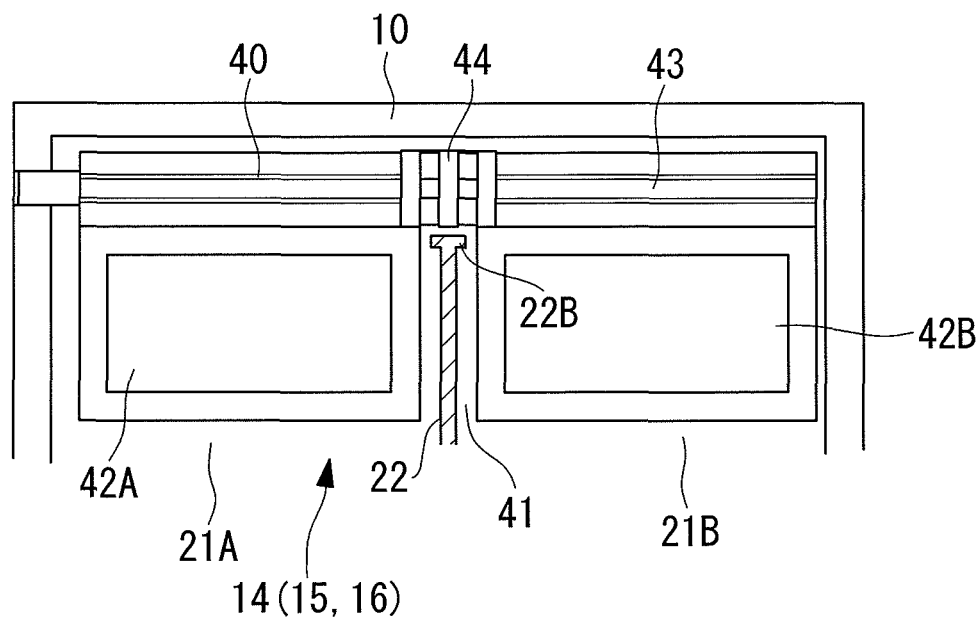
FIG. 4 is a fragmentary cross-sectional view of a blowing-mode door installation portion of the air-conditioning unit of the vehicle air-conditioning apparatus shown in FIG. 1.
Figure 5:
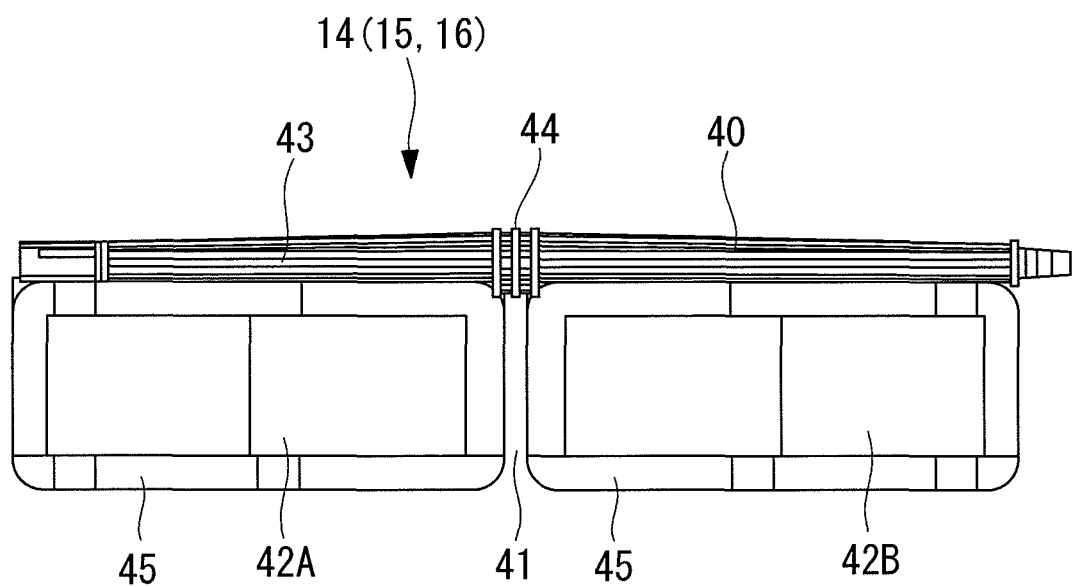
FIG. 5 is a front view of the blowing-mode door of the air-conditioning unit of the vehicle air-conditioning apparatus shown in FIG. 1.
Figure 6:
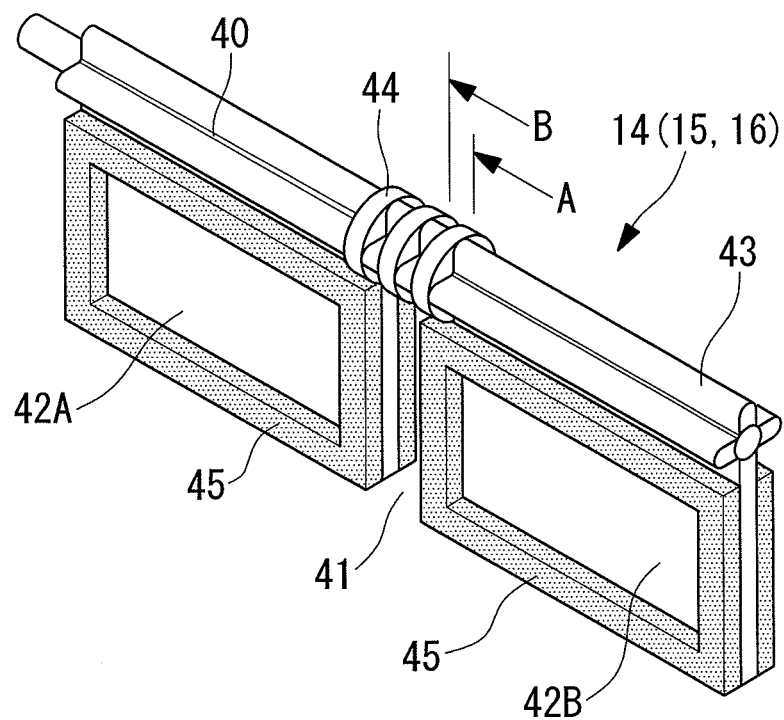
FIG. 6 is a perspective view of the blowing-mode door of the air-conditioning unit of the vehicle air-conditioning apparatus shown in FIG. 1.

As shown in FIGS. 4 to 6, the face door 14 has a rotating shaft 40 and a pair of left and right plate-like doors 42A and 42B integrally provided at the right half and the left half of the rotating shaft 40, with a gap 41 therebetween, and is rotatably installed in the air-conditioner case 10 via the rotating shaft 40. Ends of the doors 14, 15, and 16 are linked together using a link mechanism (not shown) and are operated cooperatively by an actuator (not shown). As shown in FIG. 4, the plate-like doors 42A and 42B of each of the doors 14, 15, and 16 are disposed in the two air channels 21A and 21B partitioned by the partition plate 22 and are installed such that the gap 41 between the pair of plate-like doors 42A and 42B is astride the partition plate 22.

Figure 7A:
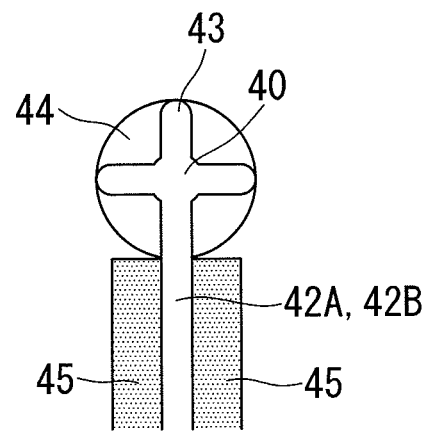
FIG. 7A is a cross-sectional view of the blowing-mode door shown in FIG. 6, taken along line A-A.
Figure 7B:
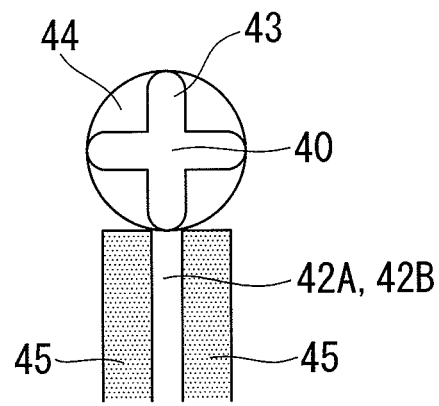
FIG. 7B is a cross-sectional view of the blowing-mode door shown in FIG. 6, taken along line B-B.

As shown in FIGS. 6, 7A, and 7B, the rotating shaft 40 of the face door 14 has ribs 43, about the shaft, which extend in the form of a cross in the directions parallel to and perpendicular to the plate surfaces of the plate-like doors 42A and 42B. The plate-like portions of the plate-like doors 42A and 42B are extensions of one of the ribs 43 (see FIG. 7A). Circular ribs 44 that connect the ribs 43 together are provided in the center of the rotating shaft 40, corresponding to the gap 41, at three locations with a predetermined pitch along the shaft.

As shown in FIG. 4, of the circular ribs 44 at the three locations, the central circular rib 44 is provided at a position facing the partition plate 22, and the circular ribs 44 at the two locations at the left and right are provided so as to be integrally joined with the pair of left and right plate-like doors 42A and 42B. Assuming that the thickness of the partition plate 22 is set at, for example, 1.5 to 2 mm, the axial thicknesses of the circular ribs 44 are set larger than the plate thickness, for example, at 2 to 3 mm. Meanwhile, the semicircular notches 36A, 36B, and 36C of the partition plate 22 can be each provided with a rib 22B having a T-shaped cross section along the periphery thereof, as shown in FIG. 4.

The plate-like doors 42A and 42B of the face door 14 are provided with air-blocking elastic sealing members 45 around the peripheries thereof by integral molding or bonding, and are configured such that they are pressed to the case 10 and the sealing surfaces 33A, 33B, 34A, 34B, 35A, 35B, etc. provided on the partition plate 22 when the air outlets are opened and closed to prevent temperature-adjusted air from leaking.

The face door 14, the defrosting door 15, and the foot door 16 described above are each constructed such that the rotating shaft 40 and the plate-like doors 42A and 42B are integrally formed of a resin material by injection molding. Therefore, if the rotating shaft 40 is made thick to ensure the necessary strength, the difference in thickness between it and the plate-like doors 42A and 42B becomes excessively large, so that shrinkage occurs during molding, thus causing deformation. Thus, by forming the rotating shaft 40 in a cross-shaped cross section using the ribs 43, the necessary strength can be ensured with the thickness of the rotating shaft 40 being substantially the same as those of the plate-like doors 42A and 42B. Furthermore, the torsional strength at the portion of the rotating shaft 40 corresponding to the gap 41 is decreased because the gap 41 is formed between the plate-like doors 42A and 42B. Therefore, the circular ribs 44, including the circular rib 44 serving as an air shield, are provided at three portions of the portion in question, two of which are integrally joined with the plate-like doors 42A and 42B, so that the portion corresponding to the gap 41 is reinforced.

With the above-described structure, this embodiment offers the following operational advantages.

The external air from the exterior of the vehicle or the internal air from the interior of the vehicle cabin, which is selectively introduced by the internal/external-air switching unit 7 of the air-blowing unit 2, is forced by the centrifugal air blower 4 and is sent to the air-conditioning unit (HVAC unit) 3. In the air-conditioning unit 3, the air is cooled by heat exchange with the refrigerant while passing through the evaporator 11, is thereafter separated into the left and right air channels 21A and 21B partitioned by the partition plate 22, and is circulated. In the air channels 21A and 21B, the ratio of the amount of air circulated through the warm-air channels 25A and 25B to the amount of air circulated through the bypass channels 26A and 26B is adjusted in accordance with the degrees of openings of the air-mixing dampers 13A and 13B. The airflow circulated through the warm-air channels 25A and 25B is heated by the heater core 12 and is then mixed with the cool air circulated through the bypass channels 26A and 26B in the air-mixing regions 27A and 27B into temperature-adjusted air having a predetermined temperature.

The air-mixing dampers 13A and 13B are independently adjusted in the degrees of openings to adjust the ratio of the amount of air for each of the left and right air channels 21A and 21B, thereby independently adjusting the temperatures of the temperature-adjusted air. In this way, the air-mixing dampers 13A and 13B function as temperature-adjusting means in the air channels 21A and 21B. The airflow that is made temperature-adjusted air having a predetermined temperature in the air-mixing regions 27A and 27B is blown into the vehicle cabin through one or two of the air outlets of the face air outlets 17A and 17B, the defrosting air outlets 18A and 18B, the foot air outlets 19A and 19B, and the rear-seat duct 20 in accordance with a blowing mode selected using the plurality of mode doors 14, 15, and 16 to be used in air conditioning of the interior of the vehicle cabin.

The same mode is used for the air channels 21A and 21B, that is, for the driver seat side and the passenger seat side, because all of the face door 14, the defrosting door 15, and the foot door 16 are integrally molded doors. The mode doors 14, 15, and 16 are rotated by application of rotating torque to one end of the rotating shafts 40 with the actuator, and the elastic sealing members 45 provided on the plate-like doors 42A and 42B are pressed onto the air outlets 17A, 17B, 18A, and 18B and the sealing surfaces 33A, 33B, 34A, 34B, 35A, and 35B of the foot channels 28A and 28B, thereby opening and closing the air outlets and the channels thereof.

Meanwhile, the face door 14, the defrosting door 15, and the foot door 16 described above are temporarily mounted in such a manner that the rotating shafts 40 are respectively fitted in the semicircular notches 36A, 36B, and 36C of the partition plate 22 installed in the lower case 10A of the air-conditioner case 10 so as to straddle the partition plate 22 using the gap 41 between the plate-like doors 42A and 42B, in which state it is installed in the left and right separate cases 10B and 10C together with the partition plate 22. As shown in FIG. 4, the central circular rib 44 of the three circular ribs provided around the rotating shaft 40 faces the peripheries of the semicircular notches 36A, 36B, and 36C of the partition plate 22, with the rotating shaft 40 of each of the mode doors 14, 15, and 16 passed through the gap formed between the peripheries of the semicircular notches 36A, 36B, and 36C and the inner surface of the air-conditioner case 10.

Since the plurality of mode doors 14 to 16 can be temporarily mounted to the partition plate 22 and can be installed in the air-conditioner case 10 together with the partition plate 22 in this way, the mode doors 14 to 16 can easily be installed in the air-conditioner case 10 partitioned by the partition plate 22. Furthermore, there is no need to provide a notch etc. for incorporating the mode doors 14 to 16 other than the semicircular notches 36A, 36B, and 36C, so that the gap between the partition plate 22 and the blowing-mode doors 14 to 16 disposed astride it can be made as small as possible.

However, to maintain the independent temperature-adjusting performance of the independent-temperature-adjusting vehicle air-conditioning apparatus capable of independent temperature adjustment for each of the plurality of air channels, it is necessary to prevent circulation of the temperature-adjusted air between the air channels. This circulation (leakage) of temperature-adjusted air can include leakage of temperature-adjusted air through the gaps between the partition plate 22 and the blowing-mode doors 14, 15, and 16 disposed astride it and leakage of temperature-adjusted air through gaps caused when the strength of the doors is decreased due to the gaps 41 formed between the pair of left and right plate-like doors 42A and 42B, causing the doors to twist due to the reaction force of the air-blocking elastic sealing member 45 provided on each of the mode doors 14, 15, and 16.

Each of the mode doors 14, 15, and 16 of this embodiment has the cross-shaped ribs 43 around the shaft and the circular ribs 44 connecting the ribs 43 at three locations in the center of the shaft corresponding to the gap 41 in consideration of molding restrictions using a resin material to thereby ensure the strength of the door and the torsional rigidity of the rotating shaft 40. This can improve the torsional rigidity of the portion of the rotating shaft 40 corresponding to the gap at which the strength of the door is decreased and can prevent leakage of the temperature-adjusted air caused by twisting of the doors 14, 15, and 16 due to the reaction force of the elastic sealing members 45 when pressed against the sealing surfaces 33A, 33B, 34A, 34B, 35A, 35B, etc., thereby improving the independent temperature-adjusting performance of the independent-temperature-adjusting vehicle air-conditioning apparatus.

The ribs 43 disposed around the rotating shaft 40 of each door are joined by the circular ribs 44, and one of the circular ribs 44, that is, the circular rib 44 at the center of the three locations, is fitted so as to face the peripheries of the semicircular notches 36A, 36B, and 36C of the partition plate 22. Therefore, the circular rib 44 functions as an air-blocking rib against the leakage of the temperature-adjusted air, so that the gap between the rotating shaft 40 of each door that straddles the partition plate 22 and the partition plate 22 including the gap between the ribs 43 can be minimized. Accordingly, this can prevent leakage of the temperature-adjusted air through the gaps between the mode doors 14, 15, and 16 and the partition plate 22, thereby improving the independent temperature-adjusting performance.

Furthermore, since the left and right circular ribs 44 of the circular ribs 44 at the three locations are integrally joined with the left and right plate-like doors 42A and 42B, respectively, the torsional rigidity of the portion of the rotating shaft 30 corresponding to the gap 41 at which the strength of the door is decreased can be further improved. This structure can also reduce the amount of leakage of the temperature-adjusted air caused by twisting of the blowing-mode doors 14 to 16 due to the reaction force of the air-blocking elastic sealing member 45, thereby improving the independent temperature-adjusting performance.

Moreover, the axial thicknesses of the circular ribs 44 are set larger than the thickness of the partition plate 22, and furthermore, the rib 22B with a T-shaped cross-section is provided along the peripheries of the semicircular notches 36A, 36B, and 36C of the partition plate 22. Therefore, even if the installation positions of the blowing-mode doors 14 to 16 or the installation position of the partition plate 22 are slightly displaced due to assembly errors etc., the opposing relationship between the circular ribs 44 and the partition plate 22 can be ensured provided that it falls within the axial thicknesses of the circular ribs 44 or the T-shaped ribs 22B. This can assuredly block air through the gaps between the partition plate 22 and the blowing-mode doors 14 to 16 and can assuredly prevent leakage of the temperature-adjusted air through the gaps between the partition plate 22 and the blowing-mode doors 14 to 16 even if some assembly errors occur.

The ribs 43 and 44 provided to ensure the strength of the rotating shafts 40 of the blowing-mode doors 14 to 16 extend in the form of a cross in the directions parallel to and perpendicular to the door surfaces to facilitate die cutting, considering that they are integrally molded resin doors. Moreover, the thicknesses thereof are set substantially the same as those of the plate-like doors 42A and 42B. This can therefore improve the moldability of the mode doors 14 to 16 to allow manufacture of high-precision blowing-mode doors that are not deformed due to shrinkage and can prevent leakage of the temperature-adjusted air, etc. due to deformation during molding. Moreover, this can improve the strength using a smaller amount of resin as compared with using thick shafts, allowing lightweight and low-cost mode doors to be manufactured.

Second Embodiment

Figure 7C:
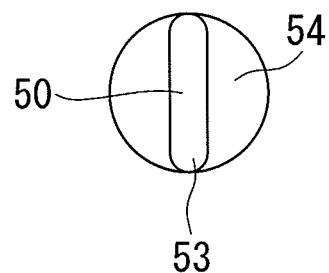
FIG. 7C is a view of the cross-sectional shape of a rotating shaft of a blowing-mode door according to a second embodiment of the present invention.

Next, a second embodiment of the present invention will be described with reference to FIGS. 7C and 7D.

This embodiment differs from the above-described first embodiment in the structure of rotating shafts 50 of the blowing-mode doors 14 to 16. Since the other features are the same as those of the first embodiment, descriptions thereof will be omitted.

Figure 7D:
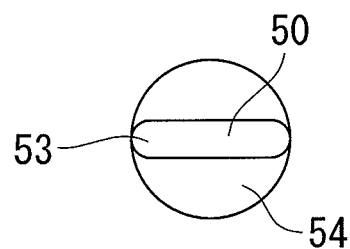
FIG. 7D is a cross-sectional view of a rotating shaft of the blowing-mode door according to the second embodiment of the present invention.

The rotating shaft 50 of this embodiment is configured such that ribs 53 provided around the shaft are provided only in the direction parallel to the plate-like doors 42A and 42B (see FIG. 7C) or only in the direction perpendicular to the plate-like doors 42A and 42B (see FIG. 7D). Circular ribs 54 that connect the ribs 53 together are provided with a predetermined pitch at three locations corresponding to the gap 41 in the center of the rotating shaft 50, as in the first embodiment.

The structure in which the rotating shaft 50 is provided with the ribs 53 and the circular ribs 54 as in the above can also provide a mode door having substantially the same advantages as the blowing-mode doors 14 to 16 of the first embodiment, although the strength is slightly lower.

The present invention is not limited to the invention according to the above-described embodiments; various modifications can be made as appropriate without departing from the spirit thereof. For example, the air-conditioner case 10 may be separated in any form. The arrangement of the evaporator 11, the heater core 12, and the air-mixing dampers 13A and 13B of the air-conditioning unit 3 can be modified variously. The rear-seat duct 20 should be provided as necessary or may be omitted. The T-shaped cross-sectional ribs 22B provided along the peripheries of the semicircular notches 36A, 36B, and 36C of the partition plate 22 may be omitted. Alternatively, also an I-shaped cross section can offer the above-described advantages, depending on the axial thickness of the circular ribs 44.

The invention claimed is:

1. A blowing-mode door applied to a vehicle air-conditioning apparatus in which an air channel is partitioned into a plurality of channels by a partition plate and temperature adjustment can be performed independently for each of the air channels, the blowing-mode door comprising:
a rotating shaft having a predetermined length; and a pair of left and right plate-like doors that are molded integrally with the rotating shaft, with a gap for preventing interference with the partition plate therebetween,
wherein the rotating shaft is formed in a cross sectional form having ribs around the shaft, the ribs extending in the direction parallel to or perpendicular to the plate surfaces of the plate-like doors or in both directions;

a plurality of circular ribs each of which connects the ribs together are provided on the rotating shaft having the cross sectional form, at a plurality of locations with a predetermined pitch; and the plurality of circular ribs comprise:

a first circular rib which is located entirely within an area corresponding to the gap in the axial direction of the rotating shaft, and a pair of second circular ribs wherein one of said pair is disposed at each side of the first circular rib in the axial direction of the rotating shaft, and joined with the left and right plate-like doors respectively the partition plate has a semicircular notch at the periphery thereof, the semicircular notch has a T-shaped cross-sectional rib along a semicircular periphery thereof, and the axial thickness of the circular ribs are larger than the thickness of the entire partition plate except for the T-shaped cross-sectional rib.

2. The blowing-mode door for the vehicle air-conditioning apparatus according to claim 1, wherein the rotating shaft, the pair of left and right plate-like doors, and the circular ribs are integrally molded of a resin material.

3. The blowing-mode door for the vehicle air-conditioning apparatus according to claim 1, wherein at least one of the circular ribs is provided at a position facing an end face of the partition plate to serve also as an air-blocking rib.

4. The blowing-mode door for the vehicle air-conditioning apparatus according to claim 1, wherein at least two of the circular ribs are respectively integrally joined with the pair of left and right plate-like doors.

5. The blowing-mode door for the vehicle air-conditioning apparatus according to claim 1, wherein the circular ribs are provided at at least three locations, wherein the first circular rib is provided at a position facing an end face of the partition plate to serve also as an air-blocking rib, and the ribs at the other two locations are respectively integrally joined with the pair of left and right plate-like doors.

6. A vehicle air-conditioning apparatus equipped with a partition plate that partitions an air channel formed in an air-conditioner case into a first channel and a second channel, first temperature-adjusting means and second temperature-adjusting means provided in the first channel and the second channel, respectively, and capable of independently adjusting the temperatures of air blown into a vehicle cabin through the individual channels, a plurality of air outlets through which the temperature-adjusted air adjusted by the first temperature-adjusting means and the second temperature-adjusting means is individually blown into the vehicle cabin, and a plurality of blowing-mode doors provided at the plurality of air outlets and selectively opening and closing the air outlets, wherein the blowing-mode doors are the blowing-mode door according to claim 1.

7. The vehicle air-conditioning apparatus according to claim 6, wherein part of each semicircular notch being open to the exterior in correspondence with the installation positions of the blowing-mode doors; and at least one of the blowing-mode doors is installed such that an outer surface of at least one of the circular ribs of the rotating shaft is facing a semicircular periphery of the semicircular notch.

8. The vehicle air-conditioning apparatus according to claim 7, wherein the blowing-mode doors are mounted in the notches of the partition plate, with the periphery of the partition plate being inserted into the gaps, and are installed in the air-conditioner case together with the partition plate.

9. The blowing-mode door for the vehicle air-conditioning apparatus according to claim 1, wherein the thickness of the semicircular notch portion in the axial direction of the rotation shaft is substantially the same as that of the entire partition plate except for the semicircular notch portion.

\* \* \* \* \*